Jan. 16, 1923.
N. CIARI.
ATTACHMENT FOR BEET CULTIVATORS.
FILED JUNE 27, 1921.
1,442,251.
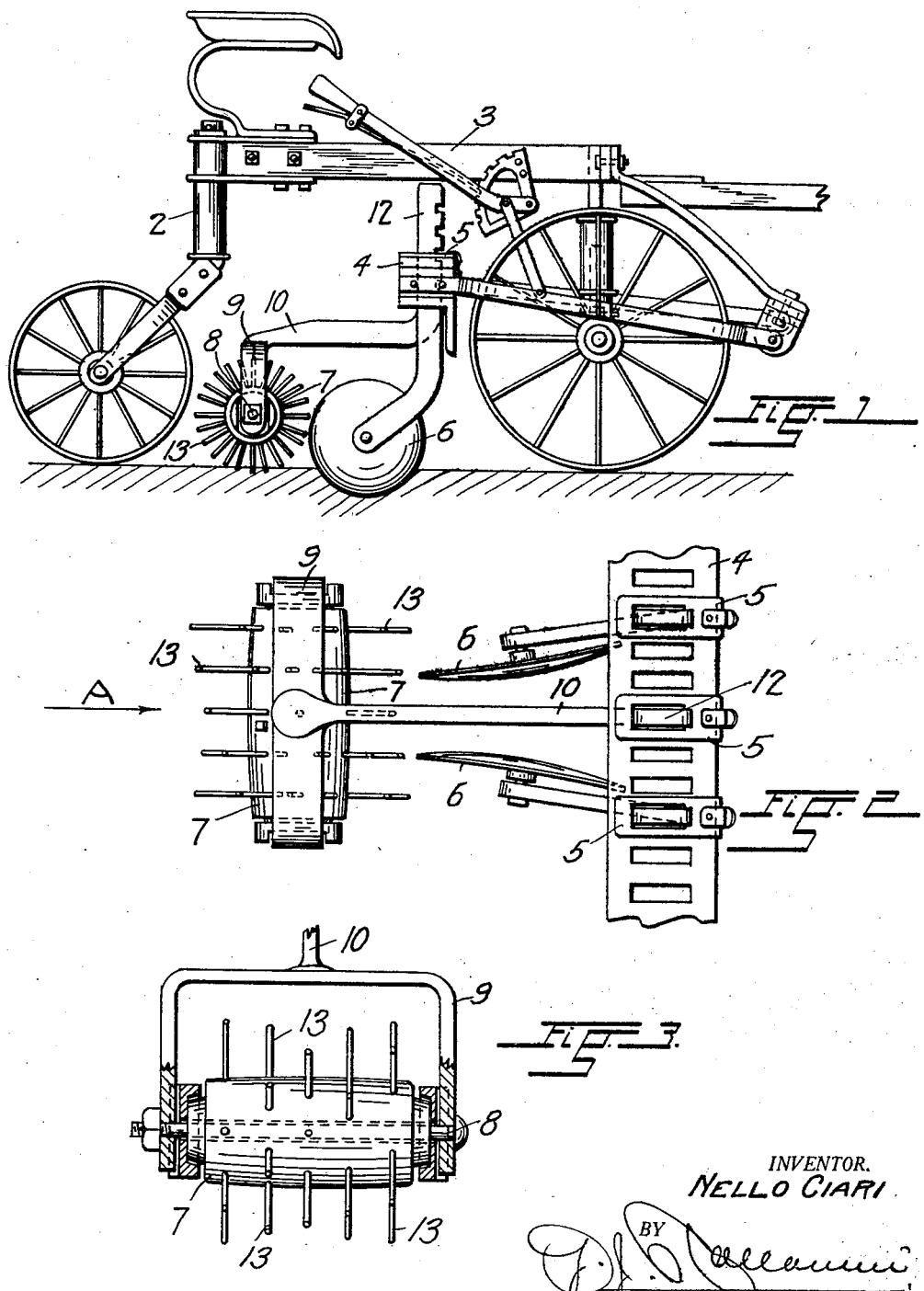
INVENTOR.
NELLO CIARI
BY
ATTORNEY.

Patented Jan. 16, 1923.

1,442,251

UNITED STATES PATENT OFFICE.

NELLO CIARI, OF WELDONA, COLORADO.

ATTACHMENT FOR BEET CULTIVATORS.

Application filed June 27, 1921. Serial No. 480,823.

*To all whom it may concern:*

Be it known that I, NELLO CIARI, a subject of King Victor Emanuel III of Italy, but having declared my intention to become a citizen of the United States of America, residing at Weldona, in the county of Morgan and State of Colorado, have invented certain new and useful Improvements in Attachments for Beet Cultivators, of which the following is a specification.

This invention relates to beet cultivators, and its primary object is to provide an attachment for implements of the type used in loosening the soil at opposite sides of beet rows, which simultaneously breaks the crusted ground over the rows before the plants have grown above the surface.

In the culture of sugar beets the production of a large and satisfactory crop is mainly dependent on a thorough cultivation of the soil before and after the plants have grown above the surface. It is customary to use for this purpose an implement equipped with shares or knives of different forms which cut through the ground at opposite sides of the rows of beets to loosen the soil and destroy the weeds.

A considerable width of ground immediately above the beets remains untouched during this operation with the result that before the beet plants break through the ground a thick and hardened crust is formed which prevents the penetration of air and moisture and thereby retards and stunts the growth of the beets.

By the use of my invention this detrimental feature in beet cultivation as at present conducted, is effectively eliminated and the entire surface of the soil of a seeded field is constantly maintained in a thoroughly loosened condition to permit of the free passage of air and moisture to the growing plants.

An embodiment of my invention has been shown in the accompanying drawings in the several views of which like parts are similarly designated, and in which—

Figure 1 represents a side elevation of a beet-cultivator of conventional construction to which my invention is applied.

Figure 2, a plan view of a portion of the tool bar of the cultivator with a pair of cutting tools and my attachment, drawn to an enlarged scale, and Figure 3, a sectional front elevation of the soil breaking element of the attachment, looking in the direction of the arrow A, Figure 2.

Referring more specifically to the drawings, the reference character 2 designates a riding cultivator including in connection with a wheel supported frame 3, a horizontally extending tool bar 4 to which the cutting members of the implement are attached by means of suitably constructed clamps 5.

The cutting members are arranged in pairs to cut the soil at opposite sides of the beet rows and they may be made in any of the several forms adapted for the purpose.

The cutting members 6 shown in the drawings are made in the form of concavo-convex disks which are convergently arranged in pairs on the tool bar of the machine, it being apparent that my invention is well adapted for use in connection with cultivating tools of this particular type.

I desire it understood, however, that I do not limit my invention for use in connection with disk-shaped cultivator tools, since under different circumstances it may be effectively employed in association with cultivating tools of different form, principal among which are the duck-foot, bull tongue, shovel and knife shape blades.

My invention consists of a hub 7 rigidly fastened upon an axle 8 the ends of which are rotatably mounted in axially alined openings of a forked yoke 9 formed at an end of an arm 10 which is adapted to be attached to the tool bar of the cultivating machine by a clamp similar to that employed in fastening the cutting tools.

The bifurcated end portion of the arm is formed at right angles to its body part which in practice extends horizontally from the tool bar and the opposite end portion 12 of the same is bent upwardly at right angles to the body part for the connection of the clamp.

The part 12 of the arm is notched to adjust the depth to which the breaking element enters the ground in the operation of the element and the hub 7 is studded with a number of radially projecting slender teeth or spikes 13 which at their inner ends are driven into bores at the circumferential surface of the same.

The attachment is arranged relative to the pair of cultivator tools with which it is associated to extend rearward thereof with relation to the direction of the operative movement of the implement and crosswise of the space between them.

When in cultivating a beet field the machine is drawn along the rows of beets with the cultivating blades of each pair in cutting engagement with the soil at opposite sides thereof, the teeth of my attachment will break the soil above the beets sufficiently to permit of the penetration of air and moisture but not deep or hard enough to injure the plants.

Having thus described my invention what I claim and desire to secure by Letters-Patent is:

1. The combination with a beet cultivator having a transverse tool bar and a pair of cutting tools thereon, of an arm fixed on said bar to extend immovably rearwardly between said tools, and a rotary ground breaking element on said arm, adapted to work the ground in a strip including the space between the tools.

2. An attachment for beet-cultivators having an apertured tool bar, comprising an arm having oppositely bent end-portions, one of which is notched for its attachment to said tool bar, and the other of which is formed into a forked yoke, and a hub rotatably mounted in said yoke and having outwardly projecting spikes.

3. An attachment for beet cultivators having a transverse tool bar, of an arm having oppositely bent end portions, one of which is adapted for rigid connection with said tool bar and the other of which is formed into a forked yoke, and a hub rotatably mounted in said yoke and having outwardly projecting spikes.

In testimony whereof I have affixed my signature.

NELLO CIARI.